United States Patent
Suzuki

(10) Patent No.: US 9,538,627 B2
(45) Date of Patent: Jan. 3, 2017

(54) LIGHT SOURCE DRIVE DEVICE, DISPLAY APPARATUS, AND LIGHT SOURCE DRIVE METHOD

(71) Applicant: SEIKO EPSON CORPORATION, Tokyo (JP)

(72) Inventor: Junichi Suzuki, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 376 days.

(21) Appl. No.: 14/157,925

(22) Filed: Jan. 17, 2014

(65) Prior Publication Data

US 2014/0218697 A1 Aug. 7, 2014

(30) Foreign Application Priority Data

Feb. 7, 2013 (JP) ................. 2013-022029

(51) Int. Cl.
| | | |
|---|---|---|
| H05B 37/02 | (2006.01) | |
| H05B 41/38 | (2006.01) | |
| G03B 21/20 | (2006.01) | |
| H05B 41/36 | (2006.01) | |
| H05B 41/288 | (2006.01) | |
| H05B 41/24 | (2006.01) | |

(52) U.S. Cl.
CPC .......... *H05B 41/38* (2013.01); *G03B 21/2053* (2013.01); *H05B 41/24* (2013.01); *H05B 41/2882* (2013.01); *H05B 41/2883* (2013.01); *H05B 41/36* (2013.01)

(58) Field of Classification Search
CPC ......... H05B 41/24; H05B 41/36; H05B 41/38; H05B 41/2882; H05B 41/2883
USPC ................. 315/209 R, 224, 294, 307, 360
See application file for complete search history.

(56) References Cited

U.S. PATENT DOCUMENTS

| | | | | |
|---|---|---|---|---|
| 7,023,146 B2* | 4/2006 | Haruna | ............. | H05B 41/2926 315/291 |
| 7,385,361 B2* | 6/2008 | Noguchi | ............ | H05B 41/2882 315/209 R |
| 8,120,264 B2* | 2/2012 | Muramatsu | .......... | H05B 41/042 315/209 R |
| 2004/0000880 A1 | 1/2004 | Ozasa et al. | | |
| 2006/0022613 A1* | 2/2006 | Suzuki | ............... | H05B 41/2888 315/291 |

(Continued)

FOREIGN PATENT DOCUMENTS

| | | |
|---|---|---|
| CN | 101690412 A | 3/2010 |
| CN | 102474961 A | 5/2012 |

(Continued)

OTHER PUBLICATIONS

Oct. 16, 2015 Search Report in Euorpean Patent Application No. 14 15 2926.3.

*Primary Examiner* — Tung X Le
(74) *Attorney, Agent, or Firm* — Oliff PLC

(57) ABSTRACT

A light source drive device includes a supply unit that supplies a high-frequency first drive signal and a second drive signal whose frequency is lower than a frequency of the first drive signal to a discharge lamp which has a pair of electrodes, and a control unit that controls the supply unit so that the first drive signal and the second drive signal of fixed durations are alternately supplied and that controls the supply unit so that the first drive signal is supplied in a case where a voltage between the pair of electrodes is below a threshold.

15 Claims, 5 Drawing Sheets

(56) References Cited

U.S. PATENT DOCUMENTS

| | | | |
|---|---|---|---|
| 2010/0013399 A1* | 1/2010 | Ono | H05B 41/2928 |
| | | | 315/224 |
| 2010/0084987 A1 | 4/2010 | Yamauchi et al. | |
| 2010/0127631 A1* | 5/2010 | Okamoto | H05B 41/2888 |
| | | | 315/246 |
| 2010/0244718 A1 | 9/2010 | Pollmann-Retsch et al. | |
| 2011/0128508 A1 | 6/2011 | Yamada et al. | |
| 2011/0210680 A1 | 9/2011 | Yamamoto et al. | |
| 2012/0074858 A1 | 3/2012 | Ono et al. | |
| 2013/0207569 A1 | 8/2013 | Conti et al. | |
| 2014/0167641 A1* | 6/2014 | Imamura | H05B 41/2887 |
| | | | 315/246 |

FOREIGN PATENT DOCUMENTS

| | | |
|---|---|---|
| EP | 2 106 202 A1 | 9/2009 |
| JP | A-2003-338394 | 11/2003 |
| JP | A-2006-185663 | 7/2006 |
| JP | A-2007-115534 | 5/2007 |
| JP | A-2010-114064 | 5/2010 |
| JP | 2010 135145 A | 6/2010 |
| JP | A-2010-533348 | 10/2010 |
| JP | 2011-138742 A | 7/2011 |

* cited by examiner

| | SCHEMATIC VIEW OF WAVEFORM | FREQUENCY | |
|---|---|---|---|
| i1 | | HIGH | SUPPRESSION OF BLACKENING |
| i2 | | LOW | RECOVERY OF INTER-ELECTRODE DISTANCE |

LIGHT SOURCE DRIVE DEVICE, DISPLAY APPARATUS, AND LIGHT SOURCE DRIVE METHOD

BACKGROUND

1. Technical Field

The present invention relates to a technique for driving a discharge lamp.

2. Related Art

Display apparatuses, such as projectors, using a discharge lamp such as a high-pressure mercury lamp as a light source are known. In such display apparatuses, a stable operation of the light source is one of factors to determine the quality of displayed images. JP-A-2007-115534 discloses a technique for supplying electromagnetic waves into an electric discharge container via an antenna and preventing the electric discharge container from melting. JP-A-2010-114064 discloses a technique for suppressing the electrode from melting by performing a control for changing a ratio between the electric energy of a period in which one of two electrodes in the discharge lamp is operated as a positive electrode and the electric energy of a period in which the electrode is operated as a negative electrode at a specific timing.

SUMMARY

An advantage of some aspects of the invention is to provide a technique for suppressing a reduction in the service life of a discharge lamp.

An aspect of the invention is directed to a light source drive device including a supply unit that supplies a high-frequency first drive signal and a second drive signal whose frequency is lower than a frequency of the first drive signal to a discharge lamp which has a pair of electrodes, and a control unit that controls the supply unit so that the first drive signal and the second drive signal of fixed durations are alternately supplied and that controls the supply unit so that the first drive signal is supplied in a case where a voltage between the pair of electrodes is below a threshold. According to the light source drive device, even in a case where the voltage between the electrodes is below the threshold, a reduction in the service life of the discharge lamp can be suppressed when compared to a case where the second drive signal continues to be supplied.

In a preferred aspect of the invention, in a case where the voltage between the pair of electrodes is below the threshold, the control unit controls the supply unit so that the first drive signal and the second drive signal of the fixed durations are alternately supplied from the time. According to this light source drive device, the first drive signal and the second drive signal are alternately supplied when the voltage between the electrodes is below the threshold.

In a preferred aspect of the invention, the control unit controls the supply unit so that the time during which the second drive signal is supplied is lengthened as the voltage between the pair of electrodes increases. According to this light source drive device, the reduction in the service life of the discharge lamp can be suppressed when compared to a case where the time during which the second drive signal is fixed.

In a preferred aspect of the invention, the threshold is lower than the voltage between the pair of electrodes at a discharge initiation time of the discharge lamp and is equal to or higher than a voltage which is 10 V lower than the voltage. According to this light source drive device, the reduction in the service life of the discharge lamp can be suppressed when compared to a case where the threshold is equal to or higher than the voltage between the electrodes at the discharge initiation time of the discharge lamp and a case where the threshold is lower than the voltage which is 10 V lower than the voltage between the electrodes at the discharge initiation time of the discharge lamp.

In a preferred aspect of the invention, the threshold is lower than a voltage which is 3 V lower than the voltage between the pair of electrodes at the discharge initiation time of the discharge lamp and is equal to or higher than a voltage which is 7 V lower than the voltage between the pair of electrodes at the discharge initiation time of the discharge lamp. According to this light source drive device, the reduction in the service life of the discharge lamp can be suppressed when compared to a case where the threshold is equal to or higher than the voltage which is 3 V lower than the voltage between the electrodes at the discharge initiation time of the discharge lamp and a case where the threshold is lower than the voltage which is 7 V lower than the voltage between the electrodes at the discharge initiation time of the discharge lamp.

In a preferred aspect of the invention, the frequency of the first drive signal is at least 1 kHz. According to this light source drive device, the second drive signal suppresses the reduction in the service life of the discharge lamp.

In a preferred aspect of the invention, the second drive signal has a plurality of frequency periods. According to this light source drive device, heat generated in the discharge lamp can be stirred when compared to a case where the second drive signal has only a single frequency component.

Another second aspect of the invention is directed to a display apparatus including a discharge lamp that includes a pair of electrodes, a supply unit that supplies a high-frequency first drive signal and a second drive signal whose frequency is lower than a frequency of the first drive signal to the discharge lamp, a control unit that controls the supply unit so that the first drive signal and the second drive signal of fixed durations are alternately supplied and that controls the supply unit so that the first drive signal is supplied in a case where a voltage between the pair of electrodes is below a threshold, and an optical modulator that modulates light which is output from the discharge lamp according to image data. According to the display apparatus, even in a case where the voltage between the electrodes is below the threshold, a reduction in the service life of the discharge lamp can be suppressed when compared to a case where the second drive signal continues to be supplied.

Still another aspect of the invention is directed to a light source drive method including alternately supplying a high-frequency first drive signal and a second drive signal whose frequency is lower than a frequency of the first drive signal to a discharge lamp which has a pair of electrodes, and switching the supply of the second drive signal to the supply of the first drive signal in a case where a voltage between the pair of electrodes is below a threshold. According to the light source drive method, even in a case where the voltage between the electrodes is below the threshold, a reduction in the service life of the discharge lamp can be suppressed when compared to a case where the second drive signal continues to be supplied.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Overview

Figure 1:
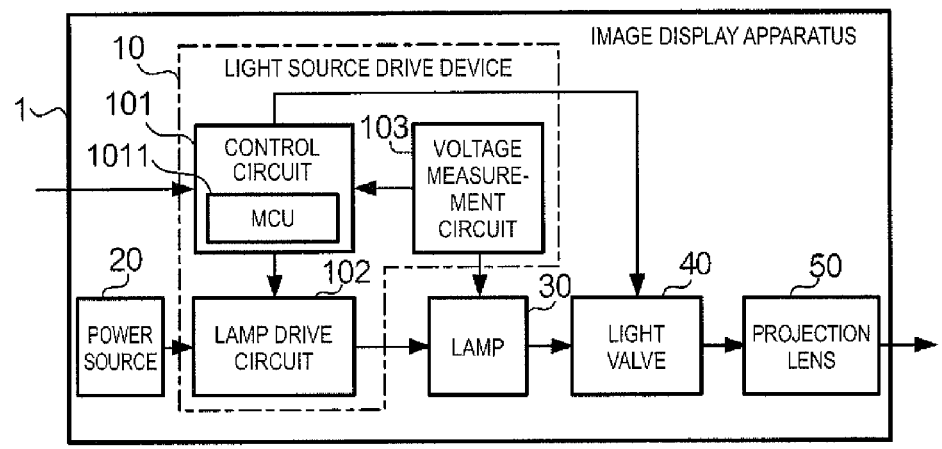
FIG. 1 is a view showing a hardware configuration of an image display apparatus.

FIG. 1 is a view showing a hardware configuration of an image display apparatus 1 according to an embodiment. In this example, the image display apparatus 1 is an apparatus that projects an image according to an image signal which is input onto a screen (not shown), that is, a projector. The image display apparatus 1 includes a light source drive device 10, a power source 20, a lamp 30 (light source), a light valve 40, and a projection lens 50. The lamp 30 is a discharge lamp that is the light source of the image which is projected, examples of which include a high-pressure mercury lamp.

Figure 2:
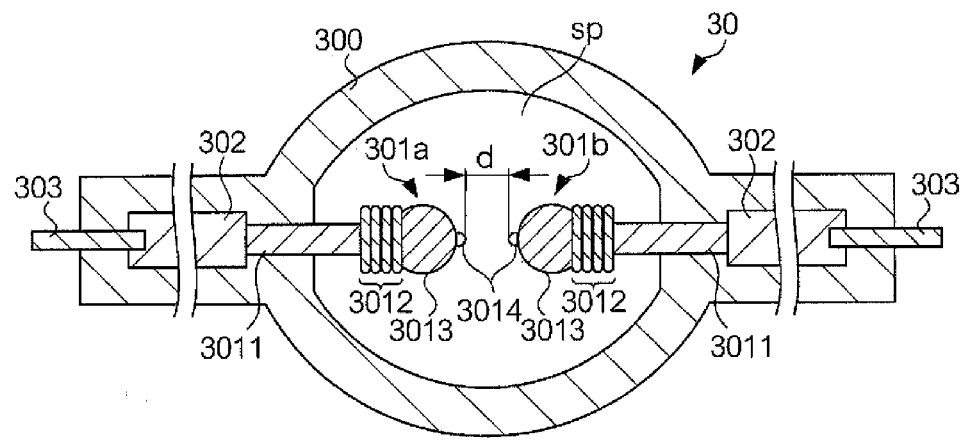
FIG. 2 is a schematic view showing a structure of a lamp.

FIG. 2 is a schematic cross-sectional view showing a structure of the lamp 30. The lamp 30 has a container 300, a pair of electrodes 301 (301a and 301b), a connection member 302, and a terminal 303. The container 300 is a member that accommodates each section of the lamp 30, and has a space sp therein. High-pressure mercury gas is sealed in the space sp. The container 300 is formed of glass such as quartz glass, optically transparent ceramics, or the like. The electrodes 301a and 301b are provided in the space sp. The electrodes 301a and 301b face each other. A distance between the electrodes 301a and 301b (hereinafter referred to as an "inter-electrode distance d") is, for example, 1 μm to 5 mm. The electrodes 301 have core rods 3011, coil sections 3012, end sections 3013, and protrusions 3014. In the electrode 301, an electrode wire such as tungsten is wound around the core rod 3011 to form the coil section 3012, and the end section 3013 is formed by heating and melting the coil section 3012. The end section 3013 is an area with a large heat capacity. The protrusion 3014 is not formed when the lamp 30 has never been turned on, but is formed when an alternating current (drive signal) is supplied to the electrode 301. The protrusion 3014 is maintained even after the lamp 30 is turned off. The connection member 302 is a conductive member that connects the electrodes 301 with the terminal 303. The terminal 303 is a terminal that supplies a current to the electrodes 301.

Referring back to FIG. 1, the power source 20 supplies a direct current to the light source drive device 10. The light source drive device 10 is a device that turns on the lamp 30. The light source drive device 10 has a control circuit 101, a lamp drive circuit 102, and a voltage measurement circuit 103. The control circuit 101 controls each section of the light source drive device 10. In this example, the control circuit 101 has a micro control unit (MCU) 1011. The MCU 1011 controls each section of the light source drive device 10 and performs image processing on the image signal which is input. The MCU 1011 outputs the image-processed image signal to the light valve 40. The lamp drive circuit 102 is a circuit that generates an alternating current by switching the polarity of the direct current which is supplied from the power source 20 to positive or negative and supplies the generated alternating current to the lamp 30. The voltage measurement circuit 103 measures a voltage between the electrode 301a and the electrode 301b (hereinafter referred to as an "inter-electrode voltage Vd").

The light valve 40 is a device that modulates light generated by the lamp 30 according to the image signal which is supplied from the MCU 1011, examples of which include a liquid crystal panel. The projection lens 50 is a lens that projects the image which is shown by the light modulated by the light valve 40 onto the screen.

The service life of the lamp 30, that is, the high-pressure mercury lamp is one of factors to determine the quality of the image display apparatus 1. Two main factors to determine the service life of the high-pressure mercury lamp are as follows.

(a) Change in the inter-electrode distance d (b) Blackening and devitrification phenomena in the container 300

Hereinafter, each of the phenomena will be described.

1-1. Change in Inter-Electrode Distance Between Facing Electrodes

When the high-pressure mercury lamp remains turned on, the electrode 301 (end section 3013 and protrusion 3014) in the container 300 is melted and the inter-electrode distance d is lengthened. When the inter-electrode distance d is lengthened, the form of arc discharge becomes elongated (that is, the shape of a light emitting section becomes elongated). When the shape of a light emitting section becomes elongated, the luminous flux that is output through an entire optical system of the projector to a projection surface is reduced. As a result, the brightness of the image that is displayed is reduced.

One of methods for suppressing the lengthening of the inter-electrode distance d is to supply a low-frequency (for example, frequency of lower than 1 kHz) alternating current to the high-pressure mercury lamp. It is known that, when the high-pressure mercury lamp is driven by using the low-frequency alternating current, the electrode is repeatedly melted and solidified and the lengthened inter-electrode distance d is shortened through recovery. In this case, there is a case where high-pressure gas in the mercury lamp is thermally stirred by providing a drive frequency with regular fluctuations (that is, by using a drive signal that has a plurality of frequency components).

1-2. Blackening and Devitrification Phenomena in Container

During the use of the high-pressure mercury lamp, a scattering material from the electrode 301 is attached into the container 300 with the elapse of the cumulative time of use. As a result, the container 300 is gradually blackened inside. The blackening phenomenon causes the temperature of the container 300 to rise as the light transmittance of the container 300 is reduced and the light is changed into heat on a surface of the container 300. As a result, the devitrification phenomenon in which the container 300 becomes cloudy occurs and, in addition, the reduction of the light transmittance is accelerated. One of known methods for suppressing the blackening and devitrification of the container 300 is to supply a high-frequency (for example, frequency of at least 1 kHz) alternating current to the high-pressure mercury lamp.

1-3. Problem in Driving Mercury Lamp

As already described, each of the change in the inter-electrode distance d and the blackening and devitrification phenomena can be suppressed by changing the frequency of the alternating current that is supplied. However, the alternating currents conflict with each other in that the alternating current that suppresses the change in the inter-electrode distance d is of low frequency and the alternating current that suppresses the blackening and devitrification is of high frequency. The lamp drive circuit 102 alternately supplies the conflicting alternating currents to the lamp 30.

Figure 3:
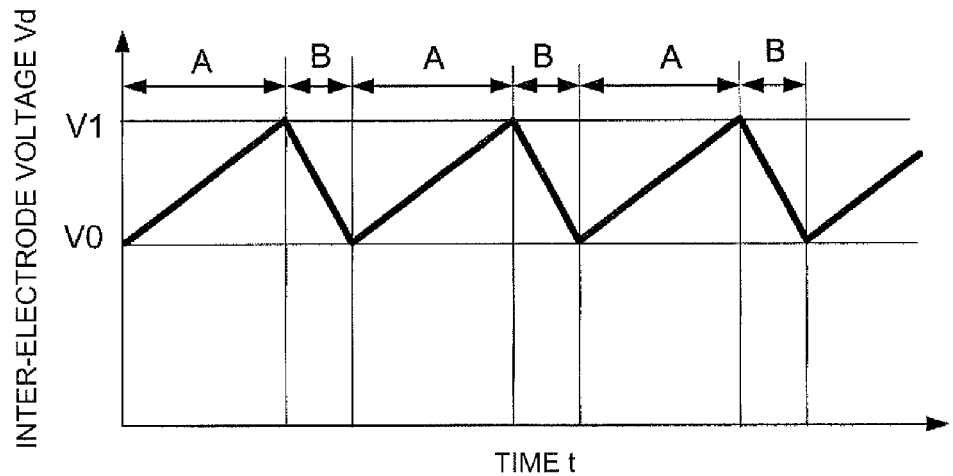
FIG. 3 is a view showing an ideal change in an inter-electrode voltage.

FIG. 3 is a view showing an ideal change in the inter-electrode voltage Vd in a case where the high-frequency alternating current and the low-frequency alternating current are alternately supplied. In FIG. 3, the horizontal axis represents time t and the vertical axis represents the inter-electrode voltage Vd. In this example, the lamp 30 is driven by a constant current (constant effective current) and the inter-electrode voltage Vd is proportional to the inter-electrode distance d. In other words, the inter-electrode voltage Vd being high represents the inter-electrode distance d being long, and the inter-electrode voltage Vd being low represents the inter-electrode distance d being short. A voltage V0 represents the inter-electrode voltage Vd at a time when discharge is initiated in the high-pressure mercury lamp (hereinafter referred to as "discharge initiation time"). A period A represents a period when the high-frequency alternating current is supplied by the lamp drive circuit 102. In the period A, the inter-electrode voltage Vd increases (the inter-electrode distance d is lengthened) with the elapse of the time. A period B represents time during which the low-frequency alternating current is supplied by the lamp drive circuit 102. In the period B, the inter-electrode voltage Vd decreases (the inter-electrode distance d is shortened) with the elapse of the time. FIG. 3 shows the ideal change in the inter-electrode voltage Vd in a case where each of the period A and the period B are driven during a fixed amount of time. In the example shown in FIG. 3, the durations of the period A and the period B are optimized, and the inter-electrode voltage Vd that rises to a voltage V1 in the period A returns to the voltage V0 in the period B. In other words, the inter-electrode distance d that is lengthened in the period A is returned to the original length through recovery in the period B. In this manner, when the low-frequency alternating current and the high-frequency alternating current are alternately supplied, each of the change in the inter-electrode distance d and the blackening and denitrification phenomena is suppressed.

However, in an early drive stage of the high-pressure mercury lamp (several hours or tens of hours from the discharge initiation time), the protrusion 3014 is likely to be formed (likely to extend) when the low-frequency alternating current is supplied. Accordingly, in the early drive stage of the high-pressure mercury lamp, the rate of change in the inter-electrode distance d is changed and it is difficult to optimize the durations of the period A and the period B.

Figure 4:
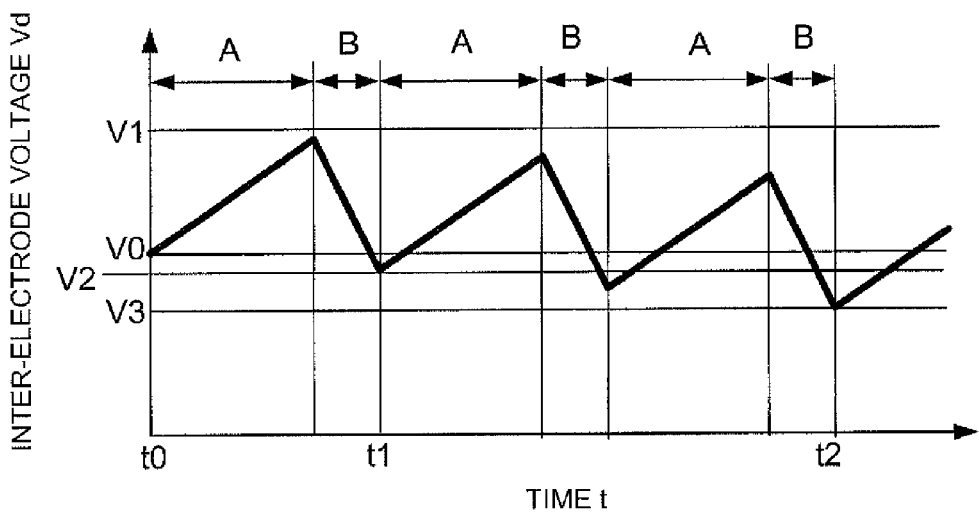
FIG. 4 is a view showing a change in the inter-electrode voltage in an early drive stage.

FIG. 4 shows a change in the inter-electrode voltage Vd in the early drive stage of the high-pressure mercury lamp. In FIG. 4, a time t0 represents the discharge initiation time. FIG. 4 shows the inter-electrode voltage Vd in a case where the period A and the period B are driven at a ratio shown in FIG. 3. As described above, since the protrusion 3014 is likely to be formed in the early drive stage of the high-pressure mercury lamp, the inter-electrode voltage Vd after the elapse of the period B is below the voltage V0. For example, the inter-electrode voltage Vd at a time t1 (after the elapse of one cycle of the period B) is V2 (<V0), and the inter-electrode voltage Vd at a time t2 (after the elapse of three cycles of the period B) is V3 (<V2). When the inter-electrode voltage Vd decreases as shown in FIG. 4, a load current flowing to the electrode 301 increases and heat is generated. Accordingly, in a case where the inter-electrode voltage Vd becomes excessively small, the blackening and devitrification of the container 300 are caused. The image display apparatus 1 according to the embodiment copes with the blackening and devitrification phenomena in the early drive stage of the lamp 30 by the processing described below.

The lamp drive circuit 102 is an example of a supply unit that supplies a high-frequency first drive signal and a second drive signal whose frequency is lower than the frequency of the first drive signal to the discharge lamp (lamp 30) which has the pair of electrodes. The MCU 1011 is a control unit that controls the lamp drive circuit 102 so that the first drive signal and the second drive signal of fixed durations are alternately supplied, and an example of control units that control the lamp drive circuit 102 so that the first drive signal is supplied in a case where the voltage between the pair of electrodes is below a threshold.

2. Operation

Figures 5, 6:
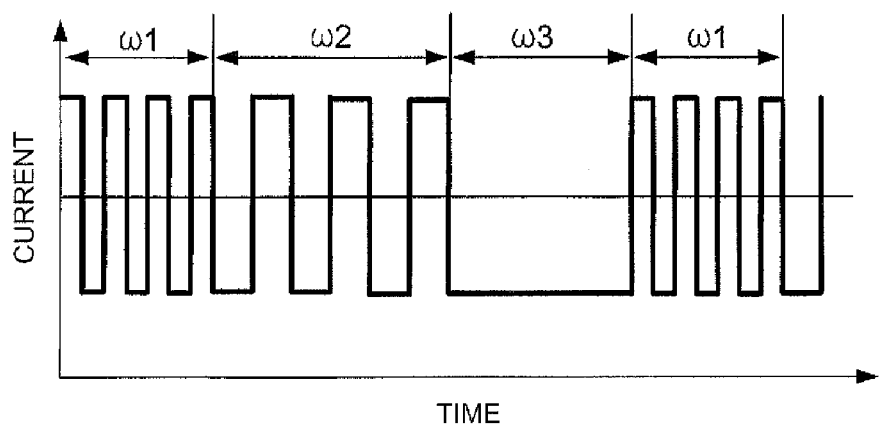
FIG. 5 is an exemplary view of a drive signal.
FIG. 6 is an exemplary view of a frequency component of the drive signal.

FIG. 5 is an exemplary view of the drive signal used in the embodiment. In this example, the lamp drive circuit 102 selectively supplies either one of two types of drive signals, that is, a high-frequency drive signal i1 and a low-frequency drive signal i2, to the lamp 30. The high frequency refers to, for example, a frequency of at least 1 kHz and the low frequency refers to, for example, a frequency of lower than 1 kHz. The drive signal i1 is a signal that is used to suppress (or reduce) the blackening and devitrification in the container 300. The drive signal i2 is a signal that is used to recover the lengthened inter-electrode distance d (or to maintain the inter-electrode distance d). In this example, the drive signal i2 has a plurality of frequency components that include a direct current component.

FIG. 6 is an exemplary view of the frequency component of the drive signal i2. In FIG. 6, the vertical axis represents the current and the horizontal axis represents the time. In this example, the drive signal i2 includes a frequency $\omega 1$ period, a frequency $\omega 2$ period, and a frequency $\omega 3$ period. The frequency $\omega 3$ period is just half-period long ($1/\omega 3/2$), and thus the polarity of the current does not change in this period. Herein, this is referred to as the direct current component. In the drive signal i2, the frequency $\omega 1$ period, the frequency $\omega 2$ period, and the frequency $\omega 3$ period are repeated. In the frequency $\omega 3$ period, a positive current period and a negative current period are switched in each cycle.

Figure 7:
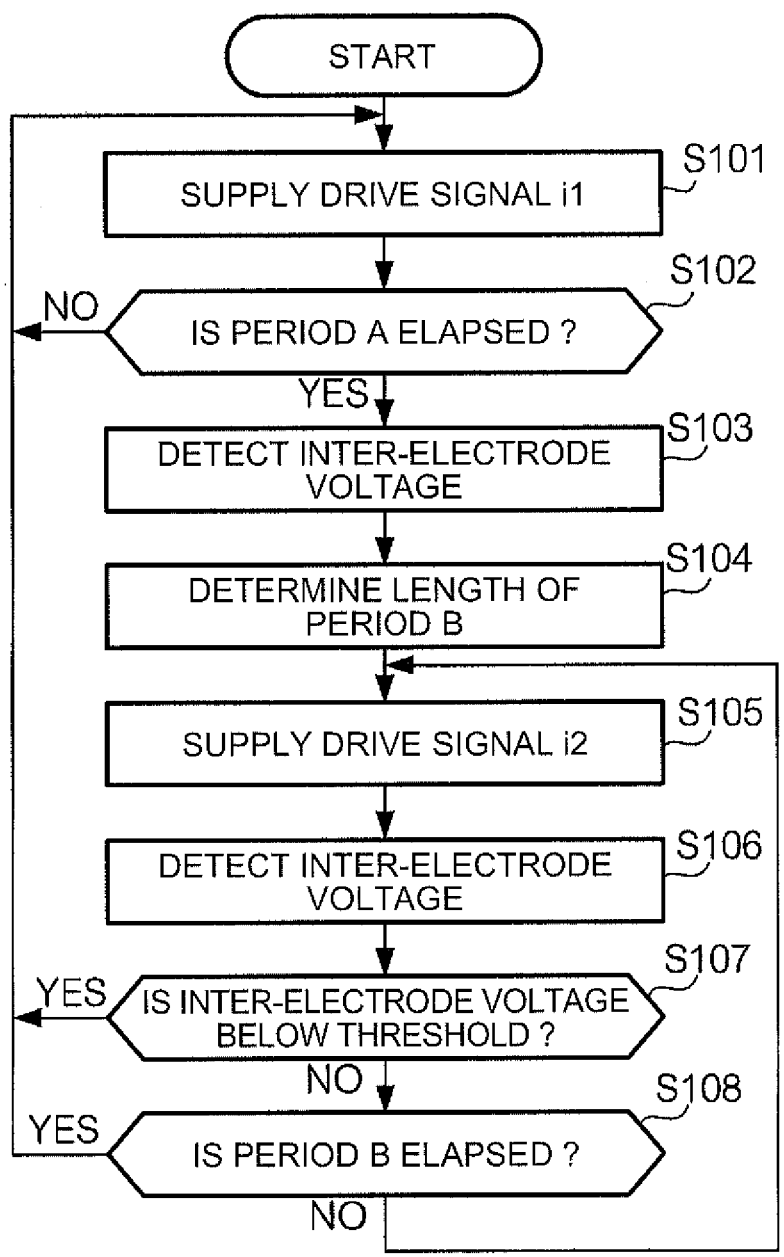
FIG. 7 is a flowchart showing an operation of the image display apparatus.

FIG. 7 is a flowchart showing an operation of the image display apparatus 1. The flow in FIG. 7 is initiated as, for example, the power source of the image display apparatus 1 is applied. In step S101, the MCU 1011 controls the lamp drive circuit 102 so that the drive signal i1 is supplied to the lamp 30. In step S102, the MCU 1011 determines whether the period A is elapsed or not. Specifically, the MCU 1011 measures the elapsed time since the supply of the drive signal i1 by using a timer which is built into the light source drive device 10 and determines whether the elapsed time exceeds the period A. The length of the period A is constant (for example, 15 minutes). In a case where the period A is determined to be elapsed (step S102: Yes), the MCU 1011 moves the processing to step S103. In a case where the period A is determined not to be elapsed (step S102: No), the MCU 1011 moves the processing to step S101.

In step S103, the MCU 1011 detects the inter-electrode voltage Vd. Specifically, the MCU 1011 samples a signal representing the inter-electrode voltage Vd from the voltage measurement circuit 103. In step S104, the MCU 1011 determines the length of the period B. Specifically, the MCU 1011 stores data in which the inter-electrode voltage Vd and the length of the period B are associated with each other in a memory which is built into the MCU 1011. The MCU 1011 determines the length of the period B based on the data. The data is programmed in advance so that the period B is lengthened as the inter-electrode voltage Vd increases. For example, in a case where the inter-electrode voltage Vd at the discharge initiation time is 70 V and the inter-electrode voltage Vd detected in step S103 is 75 V or lower, higher than 75 V and 85 V or lower, and higher than 85 V and 95 V or lower, the length of the period B is programmed to be five minutes, 10 minutes, and 15 minutes, respectively.

In step S105, the MCU 1011 controls the lamp drive circuit 102 so that the drive signal i2 is supplied to the lamp 30. In step S106, the MCU 1011 detects the inter-electrode voltage Vd. In step S107, the MCU 1011 determines whether the inter-electrode voltage Vd is below a threshold Vth or not. The threshold Vth is a reference value for the drive signal i2 to be switched to the drive signal i1. It is preferable that the threshold Vth be lower than the inter-electrode voltage V0 and be a value which is equal to or higher than the voltage which is 10 V lower than the inter-electrode voltage V0 from the viewpoint of effectively suppressing the blackening and devitrification phenomena (or damage) of the lamp 30. Further, it is preferable that the threshold Vth be lower than the voltage which is 3 V lower than the inter-electrode voltage V0 and be a value which is equal to or higher than the voltage which is 7 V lower than the inter-electrode voltage V0. For example, in a case where the inter-electrode voltage V0 of the lamp 30 is 70 V, it is preferable that the threshold Vth be at least 60 V and lower than 70 V and be at least 63 V and lower than 67 V. In a case where the inter-electrode voltage Vd is determined to be below the threshold Vth (step S107: Yes), the MCU 1011 moves the processing to step S101. In a case where the inter-electrode voltage Vd is determined not to be below the threshold Vth (step S107: No), the MCU 1011 moves the processing to step S108.

In step S108, the MCU 1011 determines whether the period B determined in step S104 is elapsed or not. Specifically, the MCU 1011 measures the elapsed time since the supply of the drive signal i2 by using the timer and determines whether the elapsed time exceeds the period B. In a case where the period B is determined to be elapsed (step S108: Yes), the MCU 1011 moves the processing to step S101. In a case where the period B is determined not to be elapsed (step S108: No), the MCU 1011 moves the processing to step S105.

According to the embodiment, when the inter-electrode voltage Vd is below the threshold Vth, the current supplied to the lamp 30 is switched from the drive signal i2 to the drive signal i1. Accordingly, in the early drive stage of the lamp 30, the inter-electrode voltage Vd decreases and the blackening and devitrification of the container 300 are suppressed. Also, according to the embodiment, the length of the period B during which the drive signal i2 is supplied increases as the inter-electrode voltage Vd increases. Accordingly, even in a case where the rate of change in the inter-electrode distance d is changed by turning on the lamp 30 for a long period of time (hundreds of hours or thousands of hours), the time ratio between the period A and the period B is maintained in an optimal state. In other words, it is possible to suppress a reduction in the service life of the light source when compared to a case where the length of the period A and the length of the period B are fixed.

3. Embodiment

Next, a specific embodiment of the invention will be described. Herein, the image display apparatus 1 that has the following configuration is used.

Embodiment

Material constituting the container of the discharge lamp: Quartz glass
Material sealed in the discharge lamp: Mercury
Atmospheric pressure in the discharge lamp that is turned on: 200 atm
Material constituting the electrode: Tungsten
Rated power: 230 W
Inter-electrode voltage at the discharge initiation time: 70 V
Frequency of the drive signal i1: 3.5 kHz
Waveform of the drive signal i1: Rectangular form
Period A: 15 minutes
Frequency of the drive signal i2: Having the plurality of frequency components of 300 Hz or less
Waveform of the drive signal i2: Rectangular form
Period B: 15 minutes (switched to the drive signal it when the inter-electrode voltage is below the threshold and the processing of step S103 and step S104 omitted in the embodiment)
Threshold of the inter-electrode voltage: 65 V

Comparative Example

The comparative example is the same as the embodiment with the only exception that the period B is fixed at 15 minutes.

Figure 8:
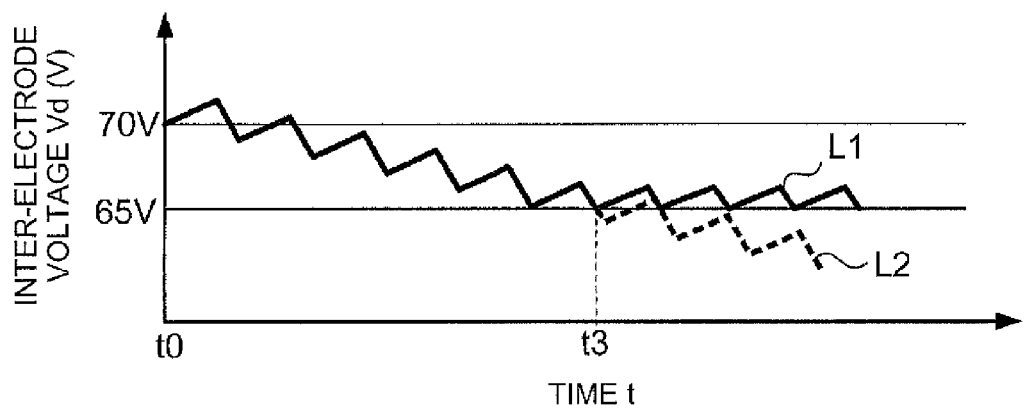
FIG. 8 is a view showing test results of an embodiment and a comparative example.

FIG. 8 is a view showing test results of the embodiment and the comparative example. In FIG. 8, the solid line L1 represents the change with time in the inter-electrode voltage Vd of the embodiment and the dashed line L2 represents a change with time in the inter-electrode voltage Vd of the comparative example. As shown in FIG. 8, in the embodiment and the comparative example, the period A and the period B are repeated five cycles and the inter-electrode voltage Vd is below 65 V at a time t3 of the sixth cycle. From the time t3 and later in the comparative example, the inter-electrode voltage Vd continues to be reduced by the cycles of the period A and the period B. In contrast, from the time t3 and later in the embodiment, the inter-electrode voltage Vd is suppressed from being further reduced.

4. Modification Example

The invention is not limited to the above-described embodiment but various modifications are possible. Hereinafter, several modification examples will be described. Two or more of the following modification examples may be used in combination.

The structure of the lamp 30 is not limited to the above-described embodiment. For example, the lamp 30 is the high-pressure mercury lamp in the above-described embodiment, but the lamp 30 may be a discharge lamp other than the high-pressure mercury lamp such as a metal halide lamp.

The high-frequency drive signal i1 has only a single frequency component in the above-described embodiment, but the drive signal i1 may have a plurality of frequency components. Also, specific examples of the drive signal i2 are not limited to what is described in the embodiment. For example, the drive signal i2 may have two or at least four frequency components and may have only a single frequency component.

The length of the period A or the period B in the above-described embodiment is an example. The length of the period A or the period B is not limited thereto.

The operation of the image display apparatus 1 is not limited to the operation shown in FIG. 7. For example, the drive signal i2 may be supplied to the lamp 30 prior to the drive signal i1. In this case, the processing of step S101 and step S102 of FIG. 7 is performed after the processing of step S103 to S108. As another example, the timing when the inter-electrode voltage Vd is detected in step S103 is not limited to the final stage of the period A. The detection of the inter-electrode voltage Vd in step S103 may be performed at any timing during the period A.

The image display apparatus 1 is not limited to the projector. The image display apparatus 1 may be a device other than the projector if the discharge lamp is used as the light source.

The entire disclosure of Japanese Patent Application No. 2013-022029, filed Feb. 7, 2013 is expressly incorporated by reference herein.

What is claimed is:

1. A light source drive device comprising:
a supply unit that supplies a first drive signal which has a first frequency and a second drive signal which has a second frequency lower than the first frequency of the first drive signal to a discharge lamp which has a pair of electrodes; and
a control unit that controls the supply unit so that the first drive signal and the second drive signal are alternately supplied to the discharge lamp, wherein
when a voltage between the pair of electrodes is below a threshold, the control unit is configured to switch from the second drive signal to the first drive signal; and
when the voltage is not below the threshold, and a time during which the second drive signal is supplied to the discharge lamp exceeds a predetermined period, the control unit is configured to switch from the second drive signal to the first drive signal.

2. The light source drive device according to claim 1, wherein the control unit controls the supply unit so that the first drive signal and the second drive signal are alternately supplied to the discharge lamp, since the voltage between the pair of electrodes is below the threshold.

3. A display apparatus comprising:
a discharge lamp that includes a pair of electrodes;
the light source drive device according to claim 2; and
an optical modulator that modulates light which is output from the discharge lamp according to image data.

4. The light source drive device according to claim 1, wherein the control unit controls the supply unit so that the predetermined period is lengthened as the voltage between the air of electrodes increases.

5. A display apparatus comprising:
a discharge lamp that includes a pair of electrodes;
the light source drive device according to claim 4; and
an optical modulator that modulates light which is output from the discharge lamp according to image data.

6. The light source drive device according to claim 1, wherein the threshold is lower than a voltage between the pair of electrodes at a discharge initiation time of the discharge lamp and is equal to or higher than a voltage which is 10 V lower than the voltage between the pair of electrodes at the discharge initiation time of the discharge lamp.

7. The light source drive device according to claim 6, wherein the threshold is lower than a voltage which is 3 V lower than the voltage between the pair of electrodes at the discharge initiation time of the discharge lamp and is equal to or higher than a voltage which is 7 V lower than the voltage between the pair of electrodes at the discharge initiation time of the discharge lamp.

8. A display apparatus comprising:
a discharge lamp that includes a pair of electrodes;
the light source drive device according to claim 7; and
an optical modulator that modulates light which is output from the discharge lamp according to image data.

9. A display apparatus comprising:
a discharge lamp that includes a pair of electrodes;
the light source drive device according to claim 6, and
an optical modulator that modulates light which is output from the discharge lamp according to image data.

10. The light source drive device according to claim 1, wherein the first frequency of the first drive signal is at least 1 kHz.

11. A display apparatus comprising:
a discharge lamp that includes a pair of electrodes;
the light source drive device according to claim 10; and
an optical modulator that modulates light which is output from the discharge lamp according to image data.

12. The light source drive device according to claim 1, wherein the second drive signal has a plurality of frequency periods.

13. A display apparatus comprising:
a discharge lamp that includes a pair of electrodes;
the light source drive device according to claim 12; and
an optical modulator that modulates light which is output from the discharge lamp according to image data.

14. A display apparatus comprising:
a discharge lamp that includes a pair of electrodes;
the light source drive device according to claim 1; and
an optical modulator that modulates light which is output from the discharge lamp according to image data.

15. A light source drive method comprising:
alternately supplying a first drive signal which has a first frequency and a second drive signal is which has a second frequency lower than the first frequency of the first drive signal to a discharge lamp which has a pair of electrodes;
when a voltage between the pair of electrodes is below a threshold, switching from the second drive signal to the first drive signal; and
when the voltage is not below the threshold, and a time during which the second drive signal is supplied to the discharge lamp exceeds a predetermined period, switching from the second drive signal to the first drive signal.

* * * * *